Oct. 31, 1939.  H. H. BLAU ET AL  2,178,134
METHOD OF FURNACE REPAIR
Filed Oct. 20, 1937  2 Sheets-Sheet 1
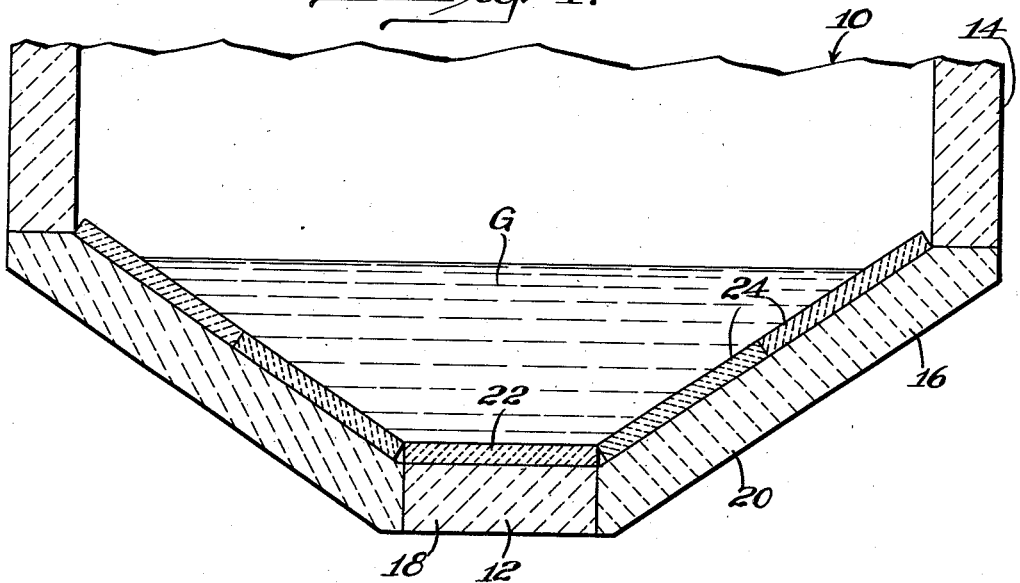
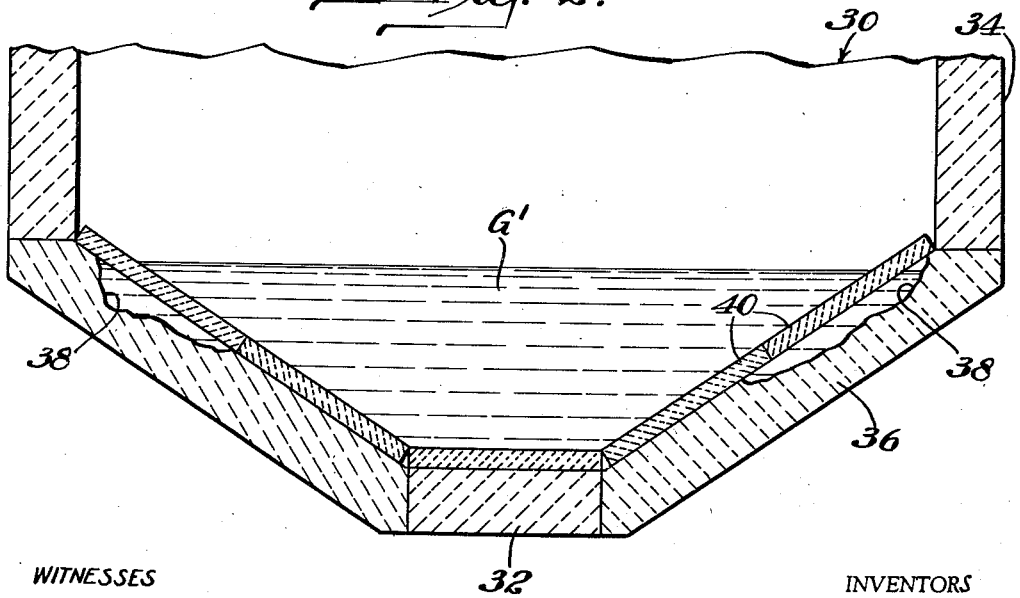

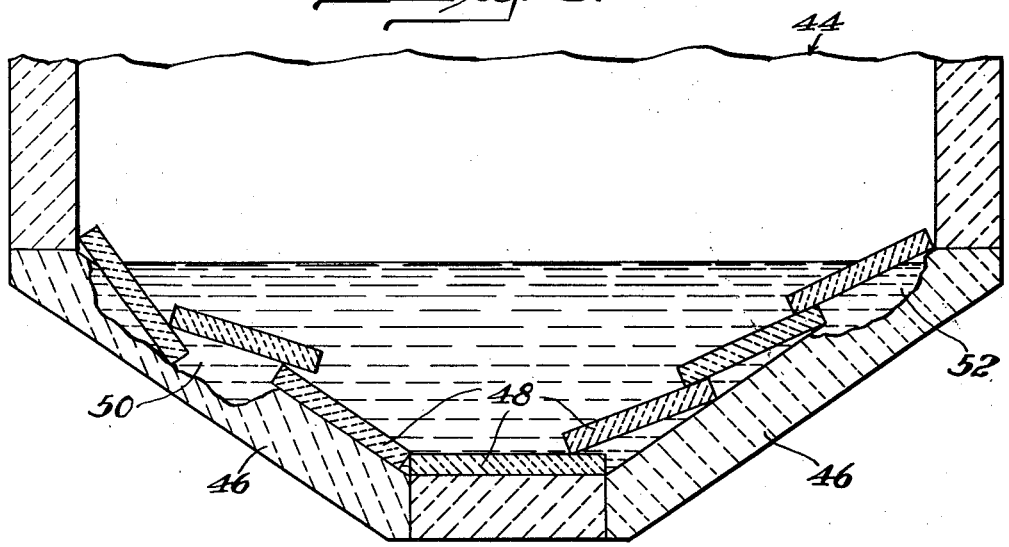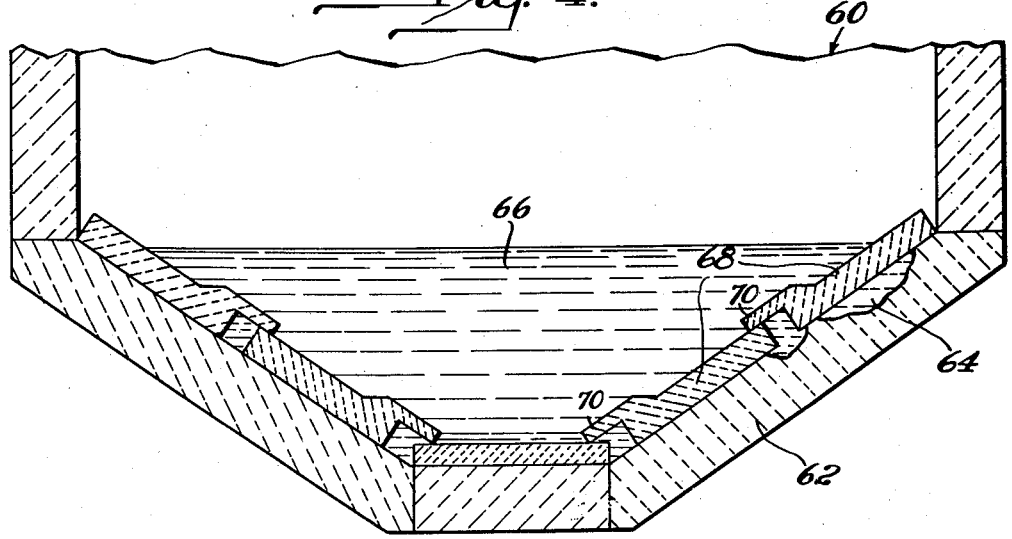

Patented Oct. 31, 1939

2,178,134

UNITED STATES PATENT OFFICE 2,178,134

METHOD OF FURNACE REPAIR

Henry H. Blau and Kenneth K. Knaell, Charleroi, Pa., assignors, by mesne assignments, to The Carborundum Company, Niagara Falls, N. Y., a corporation of Delaware Application October 20, 1937, Serial No. 169,961

3 Claims. (Cl. 49—54)

This invention relates to furnaces or tanks for melting material or treating molten material and more particularly is concerned with the construction and repair of tanks for melting glass and the like.

This application is a continuation-in-part of our copending application entitled "Furnace construction and methods of building and repair," filed June 8, 1936, Serial No. 84,029. As therein described it is desirable to operate tanks or furnaces for melting material or treating molten material over long periods continuously without necessitating shut-down for repair. However, tanks of this type and particularly tanks for melting glass have been attacked by the corrosive action of the molten glass so that thin spots have been worn in the bottoms and side walls of the tanks, as for example at the metal line, due to this corrosive action aided by the convectional and hydraulic flow of the glass. After a certain period these worn portions of the tank become so thin that it is necessary to shut down the tank and rebuild it. When a tank is shut down for repair its production facilities are lost, and in addition to the costs of repair other production inefficiencies arise, such as the possible loss of a certain part of the glass batch and the heat losses in cooling off before repair and warming up after repair. Moreover, in prior known repair operations it has been the customary practice to completely rebuild the tank when shut down, which is a relatively expensive and time-consuming operation.

It is the general object of our invention to avoid and overcome the foregoing and other difficulties by providing improved, rapid and inexpensive methods for repairing or rebuilding a tank for melting material or treating molten material and particularly a tank for melting glass while the tank is in operation.

Another object of our invention is to provide an improved construction for tanks or furnaces of refractory material as adapted for the heating or treating of glass and the like.

In the practice of our invention the worn portions of a tank wall are repaired while the tank is still hot and while it contains molten material, and particularly glass, by heating refractory material which may be, and preferably is, in the form of relatively flat blocks of cast refractory having a greater specific gravity than the material treated, to substantially the temperature of the material. After the blocks of cast refractory have been heated they are deposited through the molten material to form a covering layer at least on a portion of a wall of the tank in contact with the material.

We particularly contemplate this method of repair being used in conjunction with tank walls having an inclination with the horizontal which is sufficient to support the deposited blocks within the angle of repose so that they are retained in position by their own weight. However, we likewise contemplate employing our improved method of repair in conjunction with tank walls having an inclination with the horizontal so that the blocks are not supported within the angle of repose. In this latter instance, we arrange the blocks of cast refractory relative to each other so that they are supported on each other so as to cover the surface of the tank to be repaired, all as hereinafter more fully described.

The improved tank or furnace constructed or repaired in accordance with the principles of our invention and adapted for the melting of glass or the treating of molten glass or like materials comprises a plurality of walls, at least certain of which are inclined to the horizontal. The walls include a backing wall of relatively thick bonded refractory and a surfacing wall of relatively thin cast refractory having a specific gravity greater than the glass being treated and positioned to cover the backing wall at least adjacent the metal line, i. e., the surface line of the glass or other corroded portions of the backing wall. The inclined backing walls are preferably positioned to support the surfacing wall within the angle of repose.

In the drawings, Fig. 1 is a vertical transverse cross-sectional view through a tank constructed in accordance with the principles of our invention; Fig. 2 is a view similar to Fig. 1 and illustrates a tank repaired in accordance with our invention; Fig. 3 is a view similar to Fig. 2 but shows another manner of hot repairing a tank; and Fig. 4 is a view similar to Figs. 1 to 3 but illustrates a modified form of the invention.

Although certain of the principles of our invention are applicable, as heretofore described, to tanks for melting material or treating melted material, our invention is particularly concerned with the building and repair of tanks for melting and treating glass and accordingly has been so illustrated and will be so described. Having particular reference to the drawings, the numeral 10 indicates generally a melting tank containing glass G and having a bottom wall 12, upper side walls 14 and inclined side and bottom walls 16. The walls 12 and 16 are formed with backing walls 18 and 20 made of ordinary bonded refractory and surfacing walls 22 and 24 of cast refractory. The expression "cast refractory" used here and throughout the specification and claims is intended to cover a highly refractory corrosion-resisting material formed by fusing and casting suitable materials, such as mixtures of sand and alumina, the casting or molding of which is effected either in the containers in which the materials are fused or in separate containers. The preferred cast refractory contains not less than about 80 per cent alumina, the remainder being chiefly silica. Another suitable material is beta alumina formed by fusing alumina and about 5 per cent of sodium oxide. Cast refractory of the indicated character is heavier than molten glass and while very resistant to corrosive action has a high thermal conductivity.

The cast refractory portions 22 and 24 are ordinarily formed as relatively thin blocks of considerable length and width which, in the construction of a tank in accordance with our invention, are secured to the backing portions 18 and 20 by any suitable bonding material or clamping means. Viscous non-devitrifiable glass, as for example one containing about 60 per cent $SiO_2$, about 30 per cent $Al_2O_3$, and about 10 per cent $Na_2O$, is an instance of a bonding material which we may employ.

While not essential to the practice of our invention, we prefer to construct the tank 10 with the walls 16 being inclined to the horizontal so that the support for the cast refractory 24 is within the angle of repost of the refractory. In other words, it is positioned on the backing portion 20 by its own weight and any portions of the cast refractory which should chip off or loosen will not fall to the bottom of the tank. When the cast refractory 24 is supported within the angle of repose, which is ordinarily somewhat less than about 45° with the horizontal, we have found it possible in treating material having only medium or low corrosive characteristics to position the cast refractory 24 only in the tank at such points as are attacked most severely. Such positions include the metal line of the tank, the throat and the bridge wall.

Where the side walls of the tank are inclined to the horizontal so that their supporting surfaces are outside of the angle of repose, the cast refractory portions 24 can still be employed as above described, and under these circumstances are ordinarily positioned edge to edge so that they support each other with or without the use of additional bonding or clamping means.

In the form of our invention illustrated in Fig. 2, the numeral 30 indicates generally a tank having a bottom wall 32, side walls 34 and a combination side and bottom wall 36 formed of ordinary bonded refractory. In the operation of a tank of the character described for the melting and refining of glass, the combination side and bottom walls 36 are corrosively attached and eaten away to form pockets 38. Our invention particularly contemplates the method of repairing a tank corroded in the manner illustrated. In the practice of our improved method, relatively thin cast refractory blocks 40 of considerable width and length are preheated to substantially the temperature of the molten glass G' in the tank, and are deposited through the molten material onto the material-engaging surfaces of the walls 32 and 36 of the tank or such portions of these surfaces as deemed desirable. While it is preferable to preheat the cast refractory blocks 40 as just described before they are deposited on the tank bottom and to do so forms an important part of my inventive concept, nevertheless, I may deposit the blocks 40 in the tank without preheating and obtain some of the advantages of my invention.

The described method of tank repair is particularly adapted to the repair of tanks having inclined walls providing supporting surfaces for the blocks 40 so that the blocks are within the angle of repose. When this is done the blocks 40 can be positioned as desired to cover only a portion of the total material-contacting surfaces of the tank and will be retained in position by their own weight since they are of greater specific gravity than the glass. Where the supporting surface or surfaces of the inclined walls of the tank are beyond the angle of repose, the blocks 40 of cast refractory are positioned in side-by-side relation, as illustrated in Fig. 2, or are held by suitable fastening means in the desired position.

The cast refractory blocks are positioned to span the corroded pockets 38 in the side walls 36 and the glass G' in the pockets is trapped so that the operation of the tank can proceed in the usual manner. The trapped material supports the refractory blocks 40 and may even assist in holding them in position.

We have illustrated in Fig. 3 another manner of hot repairing a melting tank. Specifically in this figure of the drawings the numeral 44 indicates generally a glass melting tank made of ordinary bonded refractory and having sides 46 sloping within the angle of repose of cast refractory blocks 48 positioned thereon. The blocks 48 are of relatively large area and are adapted to be laid down so that they overlap each other. The actual overlap can take any of a variety of forms as long as the bottom and sides of the tank 40 or any corroded portions thereof, such as indicated at 50 and 52, are covered. On the right hand side of Fig. 3 we have illustrated a systematic manner of overlapping the blocks, while on the left hand side of Fig. 3 the blocks have been piled without any particular system to cover the corroded portions of the tank.

The use of overlapping blocks as shown in Fig. 3 eliminates the need to make the blocks fit to a nicety which is often difficult in the hot repair of a tank. The overlapping blocks restrain the flow of glass to the ordinary bonded refractory behind the blocks and likewise prevent the flow of the products of the interaction of the glass and refractory back into the active pool of glass in the tank.

In the embodiment of our invention shown in Fig. 4 the numeral 60 indicates as a whole a glass melting tank constructed of ordinary bonded refractory blocks and having inclined sides 62 which are illustrated as being corroded at 64 adjacent the surface of the molten glass 66. Blocks 68 of cast refractory of high specific gravity and resistance to corrosion are laid over the ordinary bonded refractory forming the side walls and bottom of the tank during the repair of the tank. The blocks 68 are formed with offset flange portions 70 along one or two sides which overlie the edges of adjacent blocks, so as to seal between the blocks even though the edges of the blocks do not engage. Thus a tank repair can be achieved without careful matched overlapping or abutment of the cast refractory blocks.

From the foregoing it will be recognized that the objects of our invention are achieved by the tank structures and methods of making repairs herein described. The methods facilitate tank repair without shut-down and prolong the life of a tank to thereby render material-treating operations, such as glass melting and refining, more efficient and economical.

The term "wall" as employed in the claims is intended to cover side walls, bottom walls, throat passages, bridge walls and the like of a tank or furnace, as will be understood unless otherwise expressly indicated.

While in accordance with the patent statutes, several embodiments of the invention have been illustrated and described, it should be appreciated that the invention is not limited thereto or thereby but is defined in the appended claims.

We claim:

1. That method of repairing a tank or chamber for treating molten material while in operation which comprises heating members of cast refractory. having a greater specific gravity than the molten material to substantially the temperature of the molten material, and depositing the heated members through the molten material in overlapping relation to form a covering layer on a wall of the tank in contact with the material, and supporting the members within the angle of repose.

2. That method of repairing a tank or chamber for melting glass while in operation which comprises depositing cast refractory material through the molten glass to form a covering layer on a wall of the tank in contact with the glass.

3. That method of repairing a tank or chamber for treating molten material while in operation which comprises heating refractory material, and depositing the heated refractory material through the molten material to form a covering layer on a wall of the tank in contact with the molten material.

HENRY H. BLAU.
KENNETH K. KNAELL.